(12) United States Patent
Huang et al.

(10) Patent No.: US 10,599,252 B2
(45) Date of Patent: Mar. 24, 2020

(54) INTELLIGENT TERMINAL CONTROL METHOD UTILIZING TOUCH CONTACT LOCATION AND PRESSURE

(71) Applicant: HUAWEI TECHNOLOGIES CO., LTD., Shenzhen (CN)

(72) Inventors: Maosheng Huang, Shenzhen (CN); Xueyan Huang, Shenzhen (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 15/319,354

(22) Filed: Dec. 15, 2016

(65) Prior Publication Data

US 2017/0123571 A1   May 4, 2017

Related U.S. Application Data

(63) Continuation of application No. PCT/CN2014/094709, filed on Dec. 23, 2014.

(30) Foreign Application Priority Data

Jun. 25, 2014 (CN) .......................... 2014 1 0295103

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 3/0482* (2013.01); *G06F 3/0484* (2013.01);
(Continued)

(58) Field of Classification Search
CPC ..................... G06F 3/0414; G06F 2203/04105
See application file for complete search history.

(56) References Cited

U.S. PATENT DOCUMENTS 9,262,002 B2   2/2016 Momeyer et al.
2009/0027353 A1   1/2009 Im et al.
(Continued)

FOREIGN PATENT DOCUMENTS

CN   101488069 A   7/2009
CN   101685370 A   3/2010
(Continued)

OTHER PUBLICATIONS

Search Report dated Jun. 2, 2017 in the corresponding European Application No. 14895686.5.

*Primary Examiner* — Laurence J Lee
(74) *Attorney, Agent, or Firm* — Kilpatrick Townsend & Stockton LLP

(57) ABSTRACT

The present invention relates to the terminal field, and particularly, to a terminal control method. The method includes: displaying an object management window; detecting a user input performed in the object management window, where the user input includes a screen touch position and a pressure value; determining, according to the screen touch position, the object selected by the user; and performing an operation, when the pressure value is greater than or equal to a preset threshold, the object selected by the user. By using the method and apparatus provided in the present disclosure, an operation can be quickly performed on an object in the object management window, which improves user experience.

8 Claims, 13 Drawing Sheets

(51) Int. Cl.
*G06F 9/48* (2006.01)
*G06F 3/0484* (2013.01)
*G06F 3/0481* (2013.01)
*G06F 3/0482* (2013.01)
*G06T 13/00* (2011.01)

(52) U.S. Cl.
CPC ........ *G06F 3/0488* (2013.01); *G06F 3/04817* (2013.01); *G06F 9/48* (2013.01); *G06T 13/00* (2013.01); *G06F 2203/04105* (2013.01)

(56) References Cited

U.S. PATENT DOCUMENTS

| | | |
|---|---|---|
| 2010/0026640 A1 | 2/2010 | Kim et al. |
| 2010/0060605 A1 | 3/2010 | Rimas-Ribikauskas et al. |
| 2010/0295805 A1 | 11/2010 | Shin et al. |
| 2011/0050394 A1 | 3/2011 | Zhang et al. |
| 2011/0050588 A1 | 3/2011 | Li et al. |
| 2011/0050628 A1 | 3/2011 | Homma et al. |
| 2011/0193788 A1 | 8/2011 | King et al. |
| 2012/0044172 A1 | 2/2012 | Ohki et al. |
| 2012/0062603 A1 | 3/2012 | Mizunuma et al. |
| 2012/0154447 A1 | 6/2012 | Kim et al. |
| 2012/0274662 A1 | 11/2012 | Kim et al. |
| 2012/0306765 A1 | 12/2012 | Moore |
| 2012/0326988 A1 | 12/2012 | Woo |
| 2013/0278519 A1 | 10/2013 | Wang |
| 2013/0314364 A1 | 11/2013 | Nicholson et al. |
| 2014/0028601 A1 | 1/2014 | Moore |
| 2014/0078078 A1 | 3/2014 | Lee et al. |
| 2014/0092052 A1 | 4/2014 | Grunthaner et al. |
| 2016/0188181 A1* | 6/2016 | Smith .............. G06F 3/0416 715/765 |
| 2016/0334925 A1 | 11/2016 | Ohki et al. |

FOREIGN PATENT DOCUMENTS

| | | | |
|---|---|---|---|
| CN | 101765825 A | 6/2010 | |
| CN | 101980117 A | 2/2011 | |
| CN | 102004577 A | 4/2011 | |
| CN | 102112946 A | 6/2011 | |
| CN | 102271138 A | 12/2011 | |
| CN | 102375605 A | 3/2012 | |
| CN | 102449593 A | 5/2012 | |
| CN | 102479040 A | 5/2012 | |
| CN | 102483674 A | 5/2012 | |
| CN | 102483784 A | 5/2012 | |
| CN | 102830905 A | 12/2012 | |
| CN | 202632268 U | 12/2012 | |
| CN | 103294183 A | 9/2013 | |
| CN | 103201714 A | 10/2013 | |
| CN | 103376981 A | 10/2013 | |
| CN | 103425332 A | 12/2013 | |
| CN | 103562828 A | 2/2014 | |
| CN | 103582862 A | 2/2014 | |
| CN | 104063280 A | 9/2014 | |
| EP | 2648086 A2 | 10/2013 | |
| JP | 2005142929 A | 6/2005 | |
| JP | 2006185443 A | 7/2006 | |
| JP | 2009265815 A | 11/2009 | |
| JP | 2011530101 A | 12/2011 | |
| JP | 2012118796 A | 6/2012 | |
| JP | 2012215942 A | 11/2012 | |
| JP | 2012527685 A | 11/2012 | |
| JP | 2013016082 A | 1/2013 | |
| JP | 2013520860 A | 6/2013 | |
| KR | 20100014095 A | 2/2010 | |
| KR | 20120041966 A * | 5/2012 | ............ G06F 3/041 |
| KR | 20120068266 A | 6/2012 | |
| KR | 20130069288 A | 6/2013 | |
| KR | 20130092328 A | 8/2013 | |
| KR | 20140039367 A | 4/2014 | |
| WO | 2013089539 A1 | 6/2013 | |
| WO | 2013169846 A1 | 11/2013 | |
| WO | 2013169870 A1 | 11/2013 | |
| WO | WO-2013169846 A1 * | 11/2013 | ........... G06F 3/0416 |

* cited by examiner

INTELLIGENT TERMINAL CONTROL METHOD UTILIZING TOUCH CONTACT LOCATION AND PRESSURE

CROSS-REFERENCE TO RELATED APPLICATIONS

This application is a continuation of International Application No. PCT/CN2014/094709, filed on Dec. 23, 2014, which claims priority to Chinese Patent Application No. 201410295103.5, filed on Jun. 25, 2014. The disclosures of the aforementioned applications are hereby incorporated by reference in their entireties.

TECHNICAL FIELD

The present invention relates to the terminal field, and specifically, to an intelligent terminal control method and an apparatus.

BACKGROUND

For a series of operable objects in an intelligent terminal, operation methods need to be selected from a menu to perform operations. Common operable objects include a picture, an application program, a document, and the like. Common operation methods include operations such as compressing, decompressing, copying, pasting, opening, and removing.

It can be learned from the foregoing that, for operation methods in an operation menu, if there are many operation method options or a user needs to process many operable objects, the user needs to spend time on identifying and selection, and as a result, user experience is poor.

SUMMARY

Embodiments of the present invention provide an intelligent terminal control method and an apparatus. By using the method provided in technical solutions of the present invention, a user can quickly control an operable object, which improves user experience.

A first aspect of the embodiments of the present invention discloses an intelligent terminal control method, and the method includes:
 displaying an object management window;
 detecting a user input performed in the object management window, where the user input includes a screen touch position of the user and a pressure value;
 determining, according to the screen touch position, an object selected by the user; and
 compressing, when the pressure value is greater than or equal to a preset threshold, the object selected by the user.

With reference to the first aspect, in a first possible implementation manner of the first aspect, the compressing the object selected by the user includes:
 compressing, in the object management window according to a preset compression rate, the object selected by the user.

With reference to the first aspect, in a second possible implementation manner of the first aspect, before the compressing the object selected by the user, the method further includes:
 obtaining a compression rate according to the pressure value; and
 the compressing the object selected by the user includes:
 compressing, in the object management window according to the obtained compression rate, the object selected by the user.

With reference to the first aspect, in a third possible implementation manner of the first aspect, the compressing the object selected by the user includes:
 performing, in the object management window, storage capacity compression on the object selected by the user.

A second aspect of the embodiments of the present invention discloses another intelligent terminal control method, and the method includes:
 displaying an object management window;
 detecting a user input performed in the object management window, where the user input includes a screen touch position of the user and a pressure value;
 determining, according to the screen touch position, an object selected by the user;
 displaying a remove trigger when the pressure value is greater than or equal to a preset threshold; and
 executing, when the remove trigger is activated, a remove operation on the object selected by the user.

With reference to the second aspect, in a first possible implementation manner of the second aspect,
 the displaying a remove trigger when the pressure value is greater than or equal to a preset threshold includes:
 displaying a remove animation when the pressure value is greater than or equal to the preset threshold; and
 the executing, when the remove trigger is activated, a remove operation on the object selected by the user includes:
 executing, when the remove animation is fully displayed, the remove operation on the object selected by the user.

With reference to the first possible implementation manner of the second aspect, in a second possible implementation manner of the second aspect,
 the method further includes:
 determining, when it is detected that the user finishes the user input, whether to fully display the remove animation; and
 when the remove animation is not fully displayed, stopping displaying the remove animation, and reversely demonstrating, from a stop point, the displayed remove animation from back to front.

With reference to the second aspect, in a third possible implementation manner of the second aspect,
 the displaying a remove trigger when the pressure value is greater than or equal to a preset threshold includes:
 displaying a remove confirmation button when the pressure value is greater than or equal to the preset threshold; and
 the executing, when the remove trigger is activated, a remove operation on the object selected by the user includes:
 executing, when the remove confirmation button is selected, the remove operation on the object selected by the user.

A third aspect of the embodiments of the present invention discloses another intelligent terminal control method, and the method includes:
 displaying an emoticon selection window;
 detecting a user input performed in the emoticon selection window, where the user input includes a screen touch position of the user and a pressure value;
 determining, according to the screen touch position, an emoticon type selected by the user;
 displaying, according to a dynamic change of the pressure value, an emoticon or an emoticon animation, corresponding to the pressure value, of the emoticon type selected by the user; and determining and applying, when it is detected that the user finishes the user input, the currently displayed emoticon or emoticon animation.

A fourth aspect of the embodiments of the present invention discloses an intelligent terminal, and the intelligent terminal includes:

a display unit, configured to display an object management window;

a detection unit, configured to detect a user input performed in the object management window, where the user input includes a screen touch position of the user and a pressure value;

a determining unit, configured to determine, according to the screen touch position detected by the detection unit, an object selected by the user; and a compression unit, configured to compress, when the pressure value is greater than or equal to a preset threshold, the object selected by the user.

With reference to the fourth aspect, in a first possible implementation manner of the fourth aspect, the compression unit is specifically configured to compress, in the object management window according to a preset compression rate, the object selected by the user.

With reference to the fourth aspect, in a second possible implementation manner of the fourth aspect, the intelligent terminal further includes an obtaining unit, where the obtaining unit is specifically configured to obtain a compression rate according to the pressure value; and the compression unit is specifically configured to compress, in the object management window according to the obtained compression rate, the object selected by the user.

With reference to the fourth aspect, in a third possible implementation manner of the fourth aspect, the compression unit is specifically configured to compress, in the object management window, storage capacity compression on the object selected by the user.

A fifth aspect of the embodiments of the present invention discloses another intelligent terminal, and the intelligent terminal includes:

a display unit, configured to display an object management window;

a unit, configured to detect a user input performed in the object management window, where the user input includes a screen touch position of the user and a pressure value;

a unit, configured to determine, according to the screen touch position, an object selected by the user, where the displaying unit, configured to display a remove trigger when the pressure value is greater than or equal to a preset threshold; and an execution unit, configured to execute, when the remove trigger is activated, a remove operation on the object selected by the user.

With reference to the fifth aspect, in a first possible implementation manner of the fifth aspect, the display unit is specifically configured to display a remove animation when the pressure value is greater than or equal to the preset threshold; and the execution unit is specifically configured to execute, when the remove animation is fully displayed, the remove operation on the object selected by the user.

With reference to the first possible implementation manner of the fifth aspect, in a second possible implementation manner of the fifth aspect, the intelligent terminal further includes a judging unit, where the judging unit is configured to determine, when the detection unit detects that the user finishes the user input, whether the display unit fully displays the remove animation; and the execution unit is further configured to, when the remove animation is not fully displayed, stop displaying the remove animation, and reversely demonstrate, from a stop point, the displayed remove animation from back to front.

With reference to the fifth aspect, in a third possible implementation manner of the fifth aspect, the display unit is specifically configured to display a remove confirmation button when the pressure value is greater than or equal to the preset threshold; and the execution unit is further configured to execute, when the remove confirmation button is selected, the remove operation on the object selected by the user.

A sixth aspect of the embodiments of the present invention discloses another intelligent terminal, and the intelligent terminal includes:

a display unit, configured to display an emoticon selection window;

a detection unit, configured to detect a user input performed in the emoticon selection window, where the user input includes a screen touch position of the user and a pressure value;

a determining unit, configured to determine, according to the screen touch position, an emoticon type selected by the user, where the display unit is further configured to determine, according to the pressure value, an emoticon or an emoticon animation, corresponding to the pressure value, of the emoticon type selected by the user; and an execution unit, configured to determine and apply, when the detection unit detects that the user finishes the user input, the emoticon or emoticon animation currently displayed by the display unit.

It may be learned from the first aspect and the fourth aspect that, by using the intelligent terminal control method provided in the embodiments of the present invention, a user input performed in an object management window is detected, where the user input includes a screen touch position of the user and a pressure value; an object selected by the user is determined according to the screen touch position; and when the pressure value is greater than or equal to a preset threshold, compression is performed on the object selected by the user. This facilitates a user operation on an operable object and improves user experience.

It may be learned from the second aspect and the fifth aspect that, by using the intelligent terminal control method provided in the present invention, a user input performed in an object management window is detected, where the user input includes a screen touch position of the user and a pressure value; an object selected by the user is determined according to the screen touch position; and when the pressure value is greater than or equal to a preset threshold, a remove trigger is displayed, so as to prompt the user about whether to execute a remove operation. This facilitates a user operation on the object selected by the user and improves user experience.

It may be learned from the third aspect and the sixth aspect that, by using the intelligent terminal control method provided in the present invention, a user input performed in an emoticon selection window is detected, where the user input includes a screen touch position of the user and a pressure value; an emoticon type selected by the user is determined according to the screen touch position; an emoticon or an emoticon animation, corresponding to the pressure value, of the emoticon type selected by the user is determined according to the pressure value; and when it is detected that the user finishes the user input, the currently displayed emoticon or emoticon animation is determined and applied. By detecting the pressure value, an emoticon or an emoticon animation, corresponding to the pressure value, of the emoticon type selected by the user is selected and applied. This facilitates user selection and improves user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
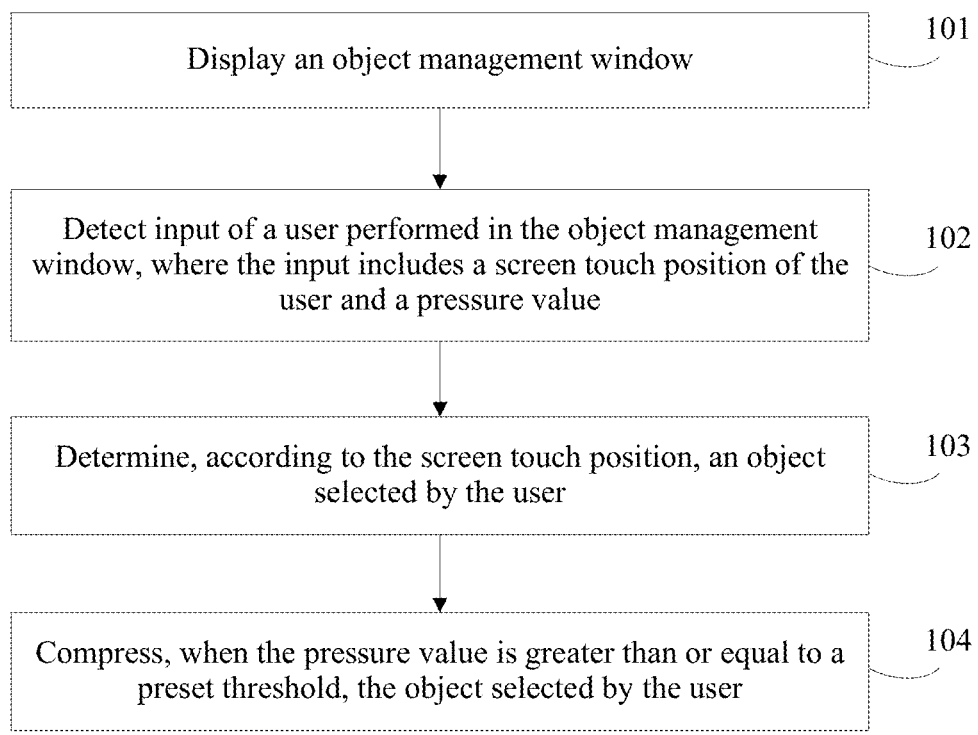
FIG. 1 is a flowchart of an intelligent terminal control method according to an embodiment of the present invention.

According to FIG. 1, the following describes an intelligent terminal control method in an embodiment of the present invention, where the control method facilitates a user operation on a video, a folder, or a document in an intelligent terminal. The method specifically includes steps 101 to 104.

101. Display an object management window.

In the object management window, each folder, video, or document is an operable object.

The intelligent terminal includes a smartphone, a tablet computer, a wearable device, and the like.

After being started, the intelligent terminal automatically enters the object management window, or the intelligent terminal may enter the object management window by using a user operation.

102. Detect a user input performed in the object management window, where the user input includes a screen touch position of the user and a pressure value.

When the user performs an operation in the object management window, the intelligent terminal needs to detect the screen touch position of the user, and obtain the pressure value of a screen touch.

The pressure value may be obtained by a component such as a pressure sensor.

103. Determine, according to the screen touch position, an object selected by the user.

The intelligent terminal determines, according to the screen touch position of the user, an object to be operated on, and the object to be operated on is the object selected by the user.

104. When the pressure value is greater than or equal to a preset threshold, perform the object selected by the user.

When the pressure value generated on the screen by the user is greater than or equal to the preset threshold, perform the object selected by the user.

The preset threshold may be set by the intelligent terminal by default or be configured by the user.

Optionally, the compressing the object selected by the user includes:

compressing, in the object management window according to a preset compression rate, the object selected by the user.

Optionally, before the compressing the object selected by the user, the method further includes:

obtaining a compression rate according to the pressure value; and the compressing the object selected by the user includes:

compressing, in the object management window according to the obtained compression rate, the object selected by the user into a package.

Greater pressure applied by the user leads to a higher compression rate used by the intelligent terminal, and a smaller size of the compressed object selected by the user.

Optionally, the compressing the object selected by the user includes:

performing, in the object management window, storage capacity compression on the object selected by the user.

It may be learned from the foregoing that, by using the intelligent terminal control method of this embodiment of the present invention, a user input performed in an object management window is detected, where the user input includes a screen touch position of the user and a pressure value; an object selected by the user is determined according to the screen touch position; and when the pressure value is greater than or equal to a preset threshold, compression is performed on the object selected by the user. This facilitates a user operation on an operable object and improves user experience.

Figure 1A:
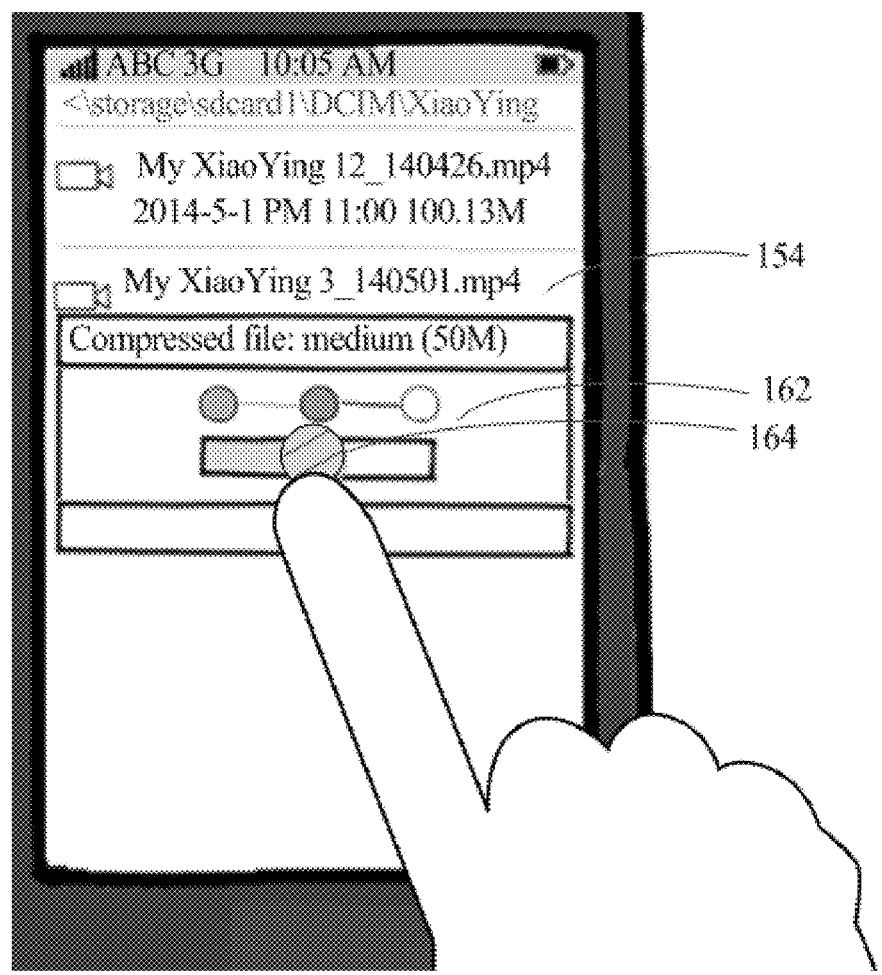
FIG. 1a and FIG. 1b are schematic diagrams of control of an intelligent terminal according to an embodiment of the present invention.
Figure 1B:
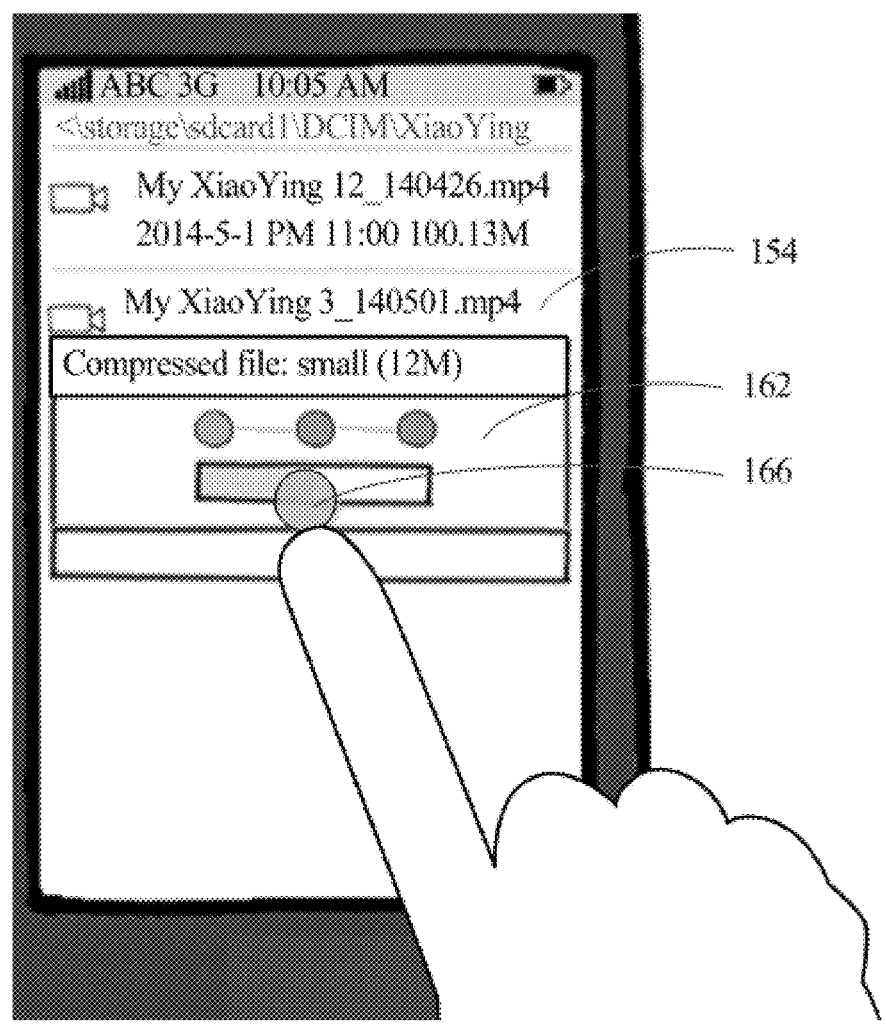

In another embodiment of the present invention, as shown in FIG. 1a and FIG. 1b, a user taps a document (154) in an object management window, and when an intelligent terminal detects that a pressure value (166) of a screen touch position of the user is greater than or equal to a preset threshold (162), the document is compressed to generate a package.

In another embodiment of the present invention, a user taps a screen of an intelligent terminal to enter a file list, selects multiple files, and applies pressure on the screen, and when the intelligent terminal detects that a pressure value of the pressure is greater than or equal to a preset threshold, the file selected by the user is compressed into a package.

In another embodiment of the present invention, a user taps a package in an object management window, and when an intelligent terminal detects that the user taps the package, and a pressure value applied on a screen of the intelligent terminal is greater than or equal to a preset threshold, decompression is performed on the package. Similarly, by using the method, the user may select multiple packages for decompression.

In another embodiment of the present invention, an object selected by a user is compressed or decompressed by detecting a pressure value, and a package may be generated or a package may be decompressed to generate a file on a default path or a path set by the user.

Figure 2:
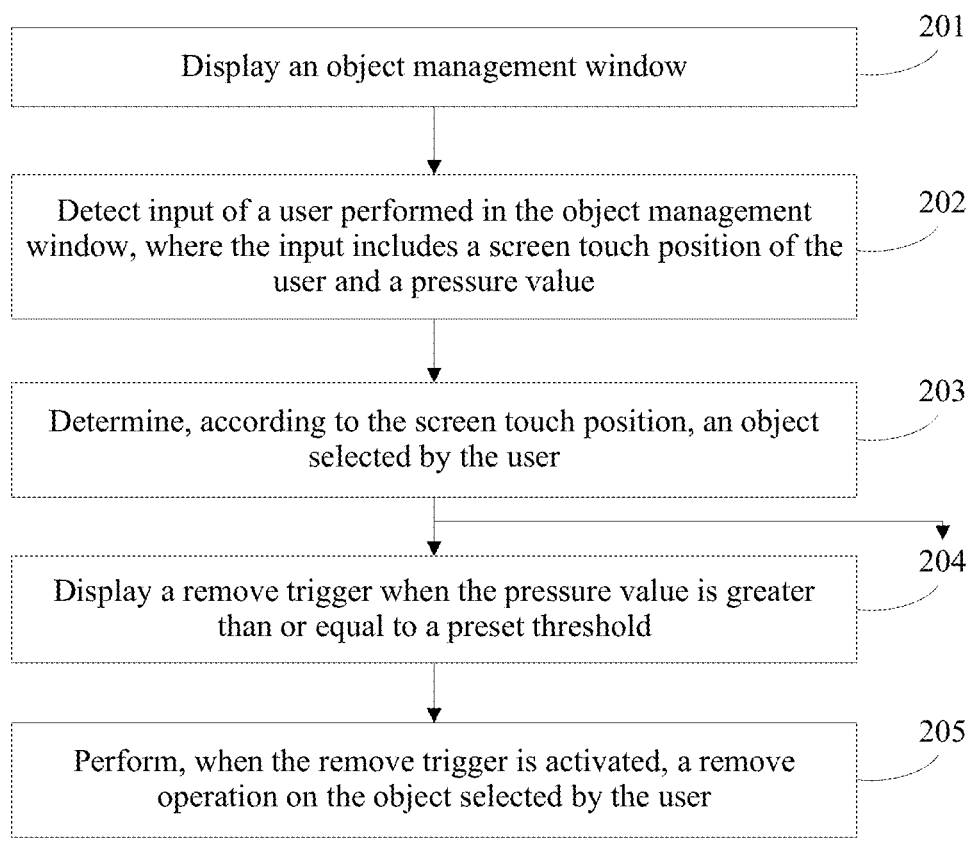
FIG. 2 is a flowchart of an intelligent terminal control method according to another embodiment of the present invention.

According to FIG. 2, the following describes another intelligent terminal control method in an embodiment of the present invention, where the control method facilitates a user operation on an application program and a document in an intelligent terminal. The method specifically includes steps 201 to 205.

201. Display an object management window.

In the object management window, each application program, folder, video, image, or document is an operable object.

The intelligent terminal includes a smartphone, a tablet computer, a wearable device, and the like.

After being started, the intelligent terminal automatically enters the object management window, or the intelligent terminal may enter the object management window by using a user operation.

202. Detect a user input performed in the object management window, where the user input includes a screen touch position of the user and a pressure value.

When the user performs an operation in the object management window, the intelligent terminal needs to detect the screen touch position of the user, and obtain the pressure value of a screen touch. The pressure value may be obtained by a component such as a pressure sensor.

203. Determine, according to the screen touch position, an object selected by the user.

The intelligent terminal determines, according to the screen touch position of the user, an object to be operated on, and the object to be operated on is the object selected by the user. For example, if the screen displays multiple objects that can be selected, such as photo thumbnails, and the user touches one of the thumbnails, it is determined that the user selects a photo corresponding to the thumbnail. If the screen displays one photo in full screen, and the user touches to select any position of the photo, it is determined that the user selects this photo object.

204. Display a remove trigger when the pressure value is greater than or equal to a preset threshold.

A first implementation manner of the remove trigger may be a remove confirmation button, and may be displayed, for example, in a form of a dialog box. The user may tap Yes or No in the dialog box to determine an operation of the user itself.

Alternatively, a second implementation manner of the remove trigger may be an animation.

205. Execute, when the remove trigger is activated, a remove operation on the object selected by the user.

In an implementation manner, the remove trigger may be the remove confirmation button, and may be displayed, for example, in the form of the dialog box. If the user taps Yes or Confirm in the dialog box, the remove trigger is activated, and the intelligent terminal executes the remove operation on the object selected by the user.

The object selected by the user may include an application program, a document, a folder, a video, an image, and the like.

The remove operation includes removing files such as a folder, a document, a video, and an image, and also includes an application program uninstallation operation.

In the alternative second implementation manner, the displaying a remove trigger when the pressure value is greater than or equal to a preset threshold includes:

displaying a remove animation when the pressure value is greater than or equal to the preset threshold; and the executing, when the remove trigger is activated, a remove operation on the object selected by the user includes:

executing, when the remove animation is fully displayed, the remove operation on the object selected by the user.

The object selected by the user may include an application program, a document, a folder, a video, an image, and the like.

The remove operation includes removing files such as a folder, a document, a video, and an image, and also includes an application program uninstallation operation.

Optionally, the method further includes:

determining, when it is detected that the user finishes the user input, whether to fully display the remove animation; and when the remove animation is not fully displayed, stopping displaying the remove animation, and reversely demonstrating, from a stop point, the displayed remove animation from back to front. That is, when the intelligent terminal demonstrates the remove animation, the user only needs to release screen touch input to abandon the remove operation. Because the remove animation stops without being fully demonstrated, the remove trigger is not activated, and the intelligent terminal does not execute the remove operation on the object selected by the user.

It may be learned from the foregoing that, by using the intelligent terminal control method provided in the present invention, a user input performed in an object management window is detected, where the user input includes a screen touch position of the user and a pressure value; an object selected by the user is determined according to the screen touch position; when the pressure value is greater than or equal to a preset threshold, a remove trigger is displayed; and when the remove trigger is activated, a remove operation is performed on the object selected by the user. By detecting the object selected by the user and the pressure value of the user input, the user is prompted, in a form of displaying the remove trigger, about whether to execute the remove operation. This facilitates a user operation on the object selected by the user and improves user experience.

Figure 2A:
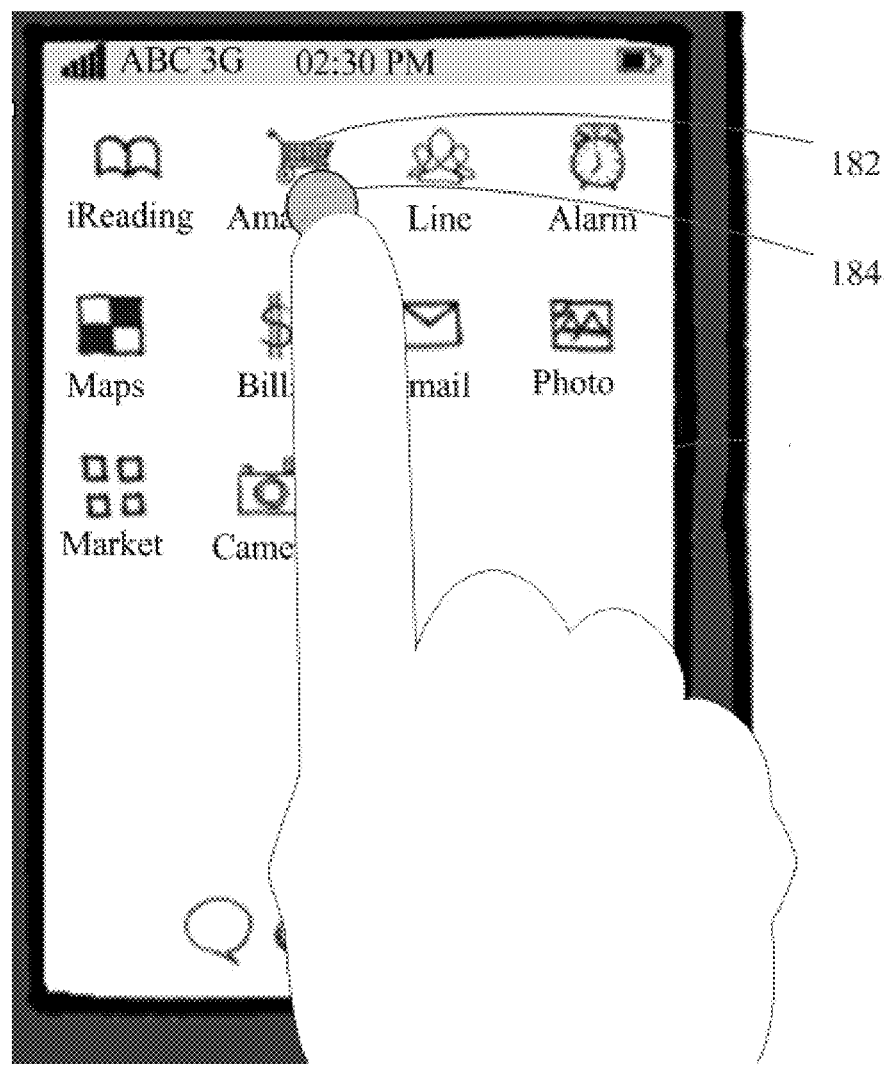
FIG. 2a to FIG. 2g are schematic diagrams of control of an intelligent terminal according to an embodiment of the present invention.
Figure 2B:
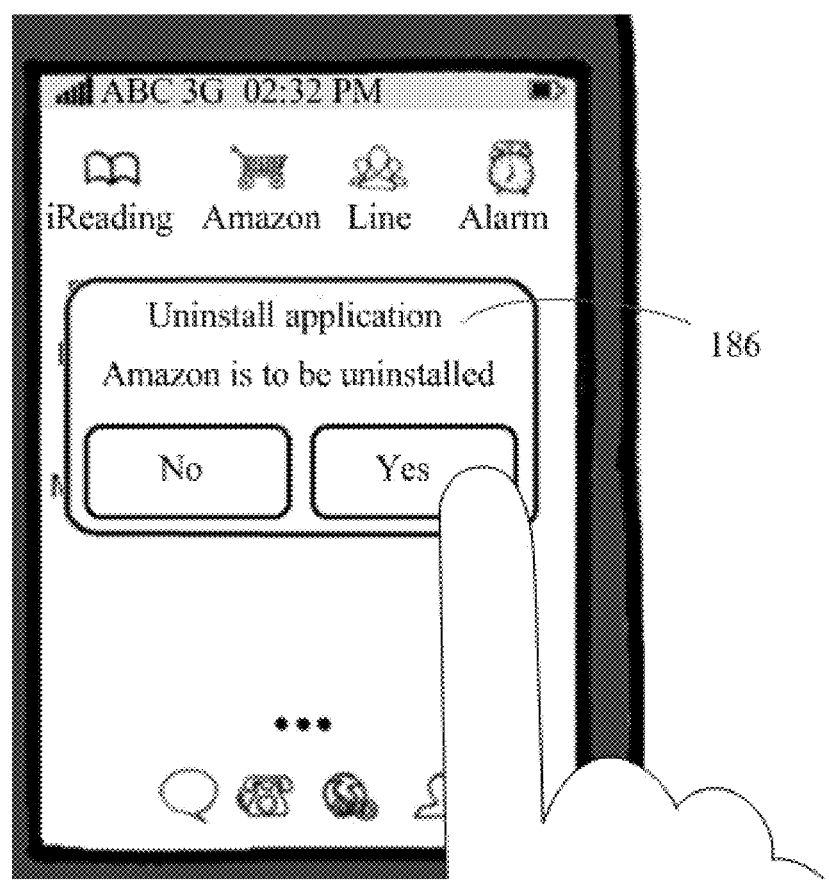
Figure 2C:
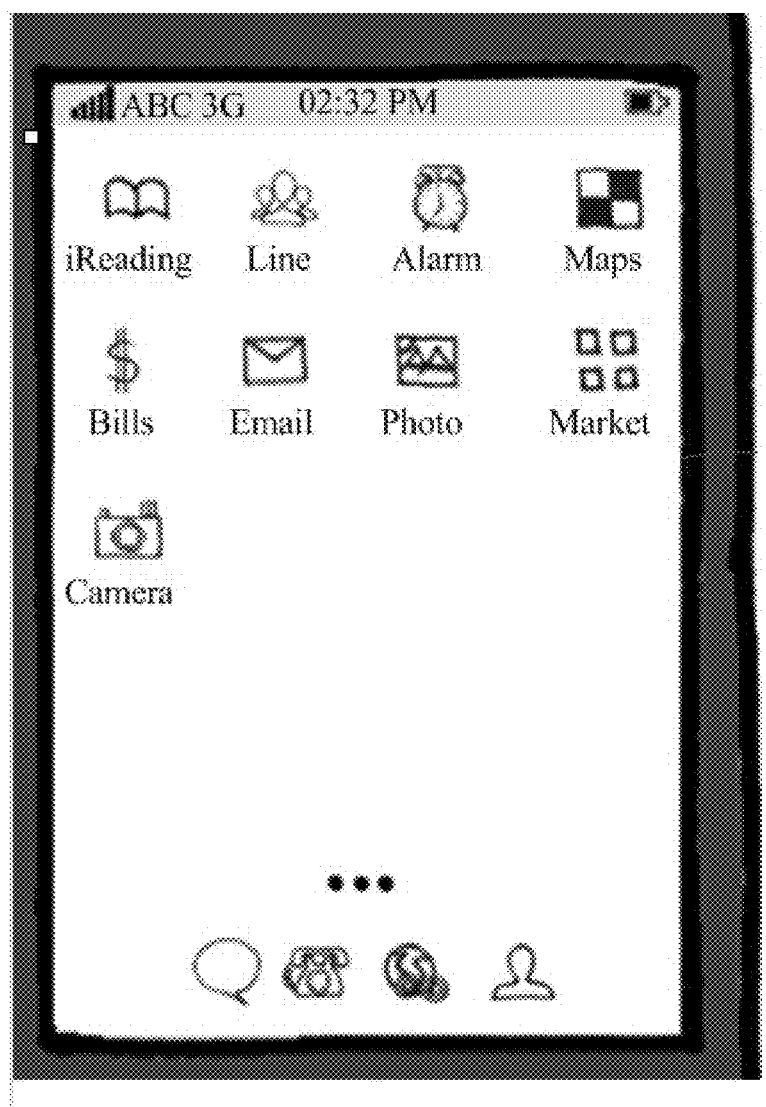

In another embodiment of the present invention, as shown in FIGS. 2a to 2c, when applied pressure (184) is greater than a preset threshold, a remove operation is executed on an object (182) selected by a user; when the object (182) selected by the user is an application program or an operating system program, an uninstall operation (186) is performed on the application program or the operating system program; when the object selected by the user is an object of the following types, the object is removed. The object types include a picture, a text, a video, music, a contact, a message, an email, an application note, a search record, a shopping record, a forum post, an alarm, and the like.

Figure 2D:
Figure 2E:
Figure 2F:
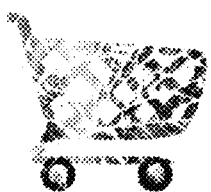
Figure 2G:
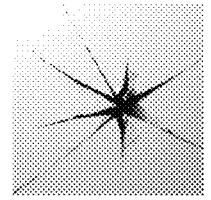

In another embodiment of the present invention, a user is prompted, in a remove animation manner, that an intelligent terminal is to remove an object selected by the user. For example, in a process of removing (including uninstalling an application program), one or more cracks occur in an object icon selected by a user until the object icon totally falls apart, as shown in FIG. 2d to FIG. 2g. If the user cancels the operation, the cracks decrease until the icon restores to its original state, as shown in FIGS. 2g to 2d.

Figure 3:
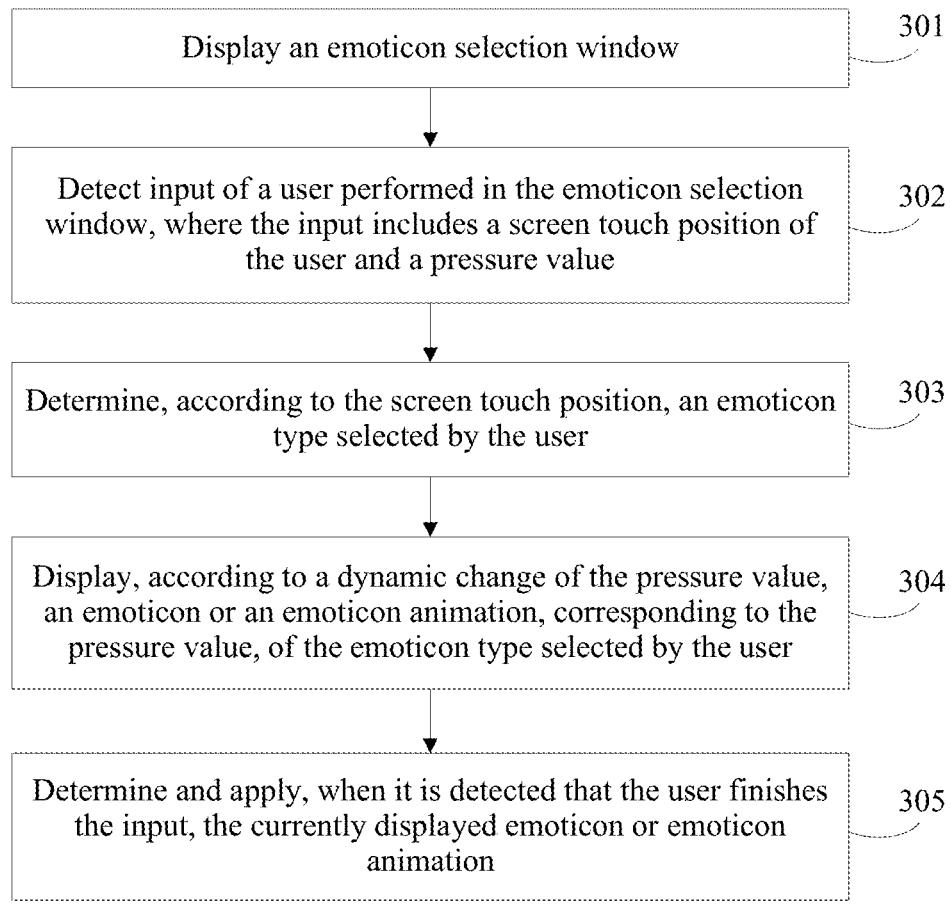
FIG. 3 is a flowchart of an intelligent terminal control method according to another embodiment of the present invention.

In an embodiment of the present invention, as shown in FIG. 3, FIG. 3 describes an intelligent terminal control method, and the control method includes steps 301 to 305:

301. Display an emoticon selection window.

When a chat is performed by using a communication tool or a comment is made by using a web page, a suitable emoticon is generally selected in the emoticon selection window to express an emotional tendency.

302. Detect a user input performed in the emoticon selection window, where the user input includes a screen touch position of the user and a pressure value.

When the user performs an operation in an emoticon selection window, the intelligent terminal needs to detect the screen touch position of the user, and obtain the pressure value of a screen touch. The pressure value may be obtained by using a pressure sensor.

303. Determine, according to the screen touch position, an emoticon type selected by the user.

The intelligent terminal determines, according to the screen touch position of the user, an emoticon type to be operated on, where the emoticon type to be operated on includes emoticons such as happiness, sadness, and each emoticon is a collection. For example, a collection of happiness includes: smile, laugh, guffaw, and the like.

304. Display, according to a dynamic change of the pressure value, an emoticon or an emoticon animation, corresponding to the pressure value, of the emoticon type selected by the user.

A different pressure value causes a change to the emoticon or the emoticon animation selected by the user. For example, if the emoticon type selected by the user is a happiness type (for example, a smile icon), when the pressure value is greater than or equal to a first preset threshold and less than a second preset threshold, a face icon stays in a smile state; when the pressure value is greater than or equal to the second preset threshold and less than a third preset threshold, the face icon stays in a guffaw state.

305. Determine and apply, when it is detected that the user finishes the user input, the currently displayed emoticon or emoticon animation.

When it is detected that the user finishes the user input, which may be that a finger of the user leaves the screen, it indicates that the user selects an emoticon or an emoticon animation.

The determining and applying the currently displayed emoticon or emoticon animation includes the emoticon displayed on the screen when the finger of the user leaves the screen. The applying the emoticon includes sending the emoticon, selecting the emoticon, or the like.

It may be learned from the foregoing that, by using the intelligent terminal control method provided in the present invention, a user input performed in an emoticon selection window is detected, where the user input includes a screen touch position of the user and a pressure value; an emoticon type selected by the user is determined according to the screen touch position; an emoticon or an emoticon animation, corresponding to the pressure value, of the emoticon type selected by the user is displayed according to a dynamic change of the pressure value; and when it is detected that the user finishes the user input, the currently displayed emoticon or emoticon animation is determined and applied. By detecting the pressure value of the user input of the user, the emoticon or emoticon animation, corresponding to the pressure value, of the emoticon type is determined. This facilitates user selection and improves user experience.

In another embodiment of the present invention, a change in a form occurs, according to a value of pressure applied by a user on a screen, in an emoticon type selected by a user. For example, when the pressure applied by the user on the screen is less than a first preset value, a selected object may be smile; when the pressure applied by the user on the screen is greater than or equal to the first preset value, the selected object may be guffaw. The first preset value may be set by an intelligent terminal by default or may be configured by the user.

Figure 4:
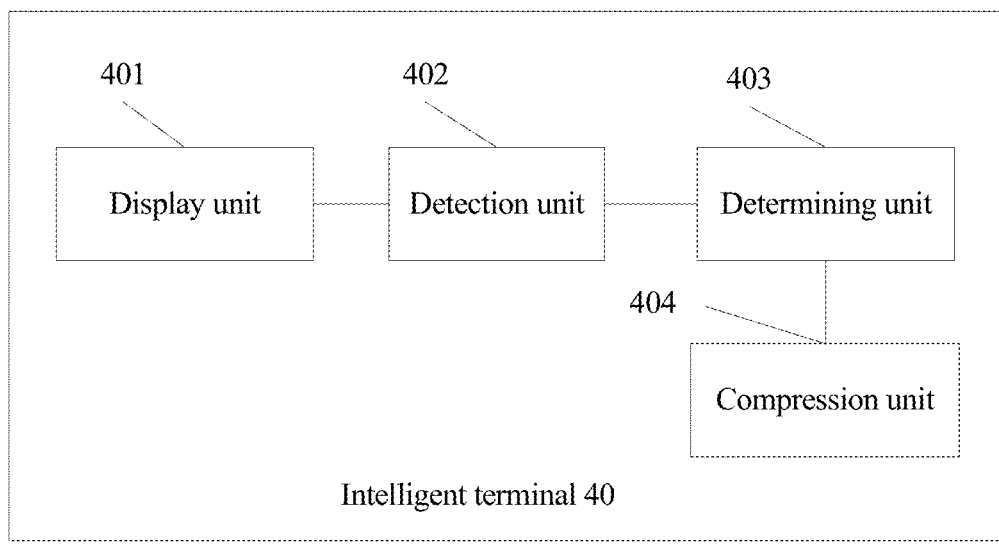
FIG. 4 is a structural diagram of an intelligent terminal according to another embodiment of the present invention.

In an embodiment of the present invention, as shown in FIG. 4, FIG. 4 is an intelligent terminal 40, where the intelligent terminal 40 may be a wearable device, a smartphone, a tablet computer, and the like.

104. When the pressure value is greater than or equal to a preset threshold, compress the object selected by the user.

When the pressure value generated on the screen by the user is greater than or equal to the preset threshold, compress the object selected by the user.

The object management window includes many objects, and the objects may be a folder, a video, a document, or the like.

The detection unit 402 is configured to detect a user input performed in the object management window, where the user input includes a screen touch position of the user and a pressure value.

When the user performs an operation in the object management window, the detection unit 402 detects the screen touch position of the user and obtains the pressure value of a screen touch.

The determining unit 403 is configured to determine, according to the screen touch position detected by the detected unit 402, an object selected by the user.

When the user performs an operation in the object management window, the determining unit 403 determines the object selected by the user such as a video, a document, and folder.

The compression unit 404 is configured to compress, when the pressure value is greater than or equal to a preset threshold, the object selected by the user.

When the detection unit 402 detects that the pressure value applied by the user on the selected object is greater than or equal to the preset threshold, the compression unit 404 compresses the object selected by the user. There are many compression manners, for example, performing compression according to a preset compression rate or performing storage capacity compression.

Optionally, the compression unit 404 is specifically configured to compress, in the object management window according to the preset compression rate, the object selected by the user.

The object selected by the user may be one or more.

Figure 4A:
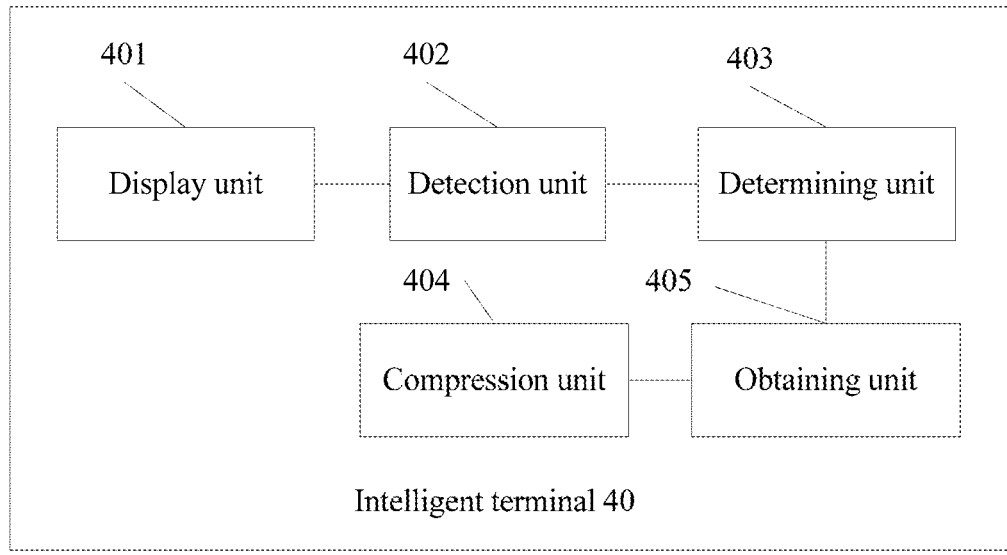
FIG. 4a is a structural diagram of an intelligent terminal according to another embodiment of the present invention.

Optionally, as shown in FIG. 4a, the intelligent terminal 40 further includes an obtaining unit 405.

The obtaining unit 405 is specifically configured to obtain a compression rate according to the pressure value.

The compression unit 404 is specifically configured to compress, in the object management window according to the obtained compression rate, the object selected by the user.

Greater pressure applied by the user leads to a higher compression rate used by the compression unit 404, and a smaller size of the compressed object selected by the user.

Optionally, the compression unit 404 is further specifically configured to compress, in the object management window, storage capacity compression on the object selected by the user.

It may be learned from the foregoing that, by using the intelligent terminal control method of this embodiment of the present invention, a user input performed in an object management window is detected, where the user input includes a screen touch position of the user and a pressure value; an object selected by the user is determined according to the screen touch position; and when the pressure value is greater than or equal to a preset threshold, compression is performed on the object selected by the user. This facilitates a user operation on an operable object and improves user experience.

Figure 5:
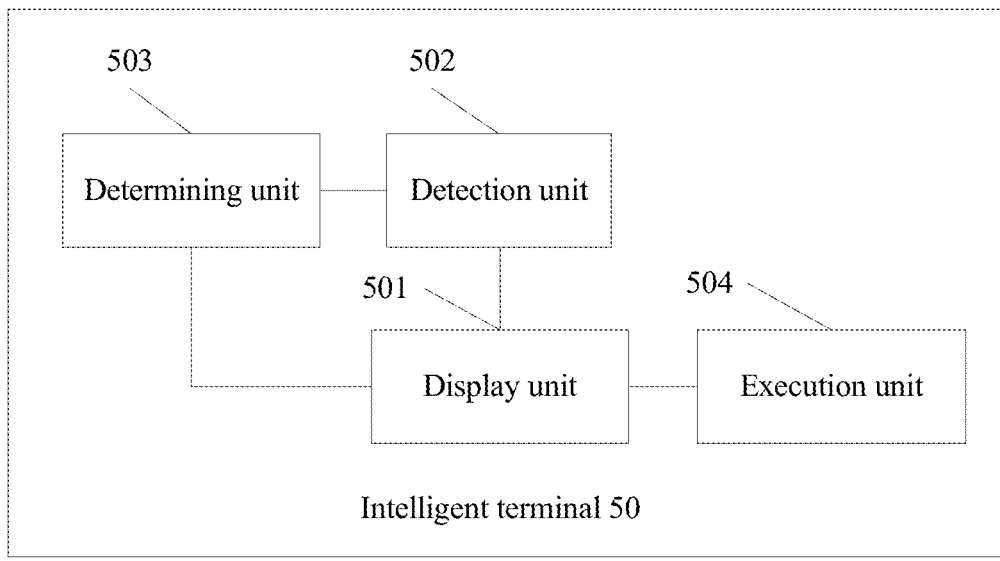
FIG. 5 is a structural diagram of an intelligent terminal according to another embodiment of the present invention.

In another embodiment of the present invention, as shown in FIG. 5, FIG. 5 is an intelligent terminal 50, and the intelligent terminal 50 includes a display unit 501, a detection unit 502, a determining unit 503, and an execution unit 504.

The display unit 501 is configured to display an object management window.

The object management window includes many objects, and an object may be an application program, a folder, a video, an image, a document, or the like.

The detection unit 502 is configured to detect a user input performed in the object management window, where the user input includes a screen touch position of the user and a pressure value.

When the user performs an operation in the object management window, the detection unit 502 needs to detect the screen touch position of the user and obtain the pressure value of a screen touch.

The determining unit 503 is configured to determine, according to the screen touch position, an object selected by the user.

The user may select one or more objects at one time, and the determining unit 503 performs confirmation according to the user selection. For example, if the screen displays multiple objects that can be selected, such as photo thumbnails, and the user touches one of the thumbnails, it is determined that the user selects a photo corresponding to the thumbnail. If the screen displays one photo in full screen, and the user touches to select any position of the photo, it is determined that the user selects this photo object.

The display unit 501 is further configured to display a remove trigger when the pressure value is greater than or equal to a preset threshold.

A first implementation manner of the remove trigger may be a remove confirmation button, and may be displayed, for example, in a form of a dialog box. The user may tap Yes or No in the dialog box to determine an operation of the user itself.

Alternatively, a second implementation manner of the remove trigger may be an animation.

The execution unit 504 is configured to execute, when the remove trigger displayed by the display unit 501 is activated, a remove operation on the object selected by the user.

In an implementation manner, the remove trigger may be the remove confirmation button, and may be displayed, for example, in the form of the dialog box. If the user taps Yes or Confirm in the dialog box, the remove trigger is activated, and the remove operation is executed on the object selected by the user.

The object selected by the user may include an application program, a document, a folder, a video, an image, and the like.

The remove operation includes removing files such as a folder, a document, a video, and an image, and also includes an application program uninstallation operation.

Optionally, the display unit 501 is specifically configured to display a remove animation when the pressure value is greater than or equal to the preset threshold.

The execution unit 504 is specifically configured to execute, when the remove animation is fully displayed, the remove operation on the object selected by the user.

Figure 6:
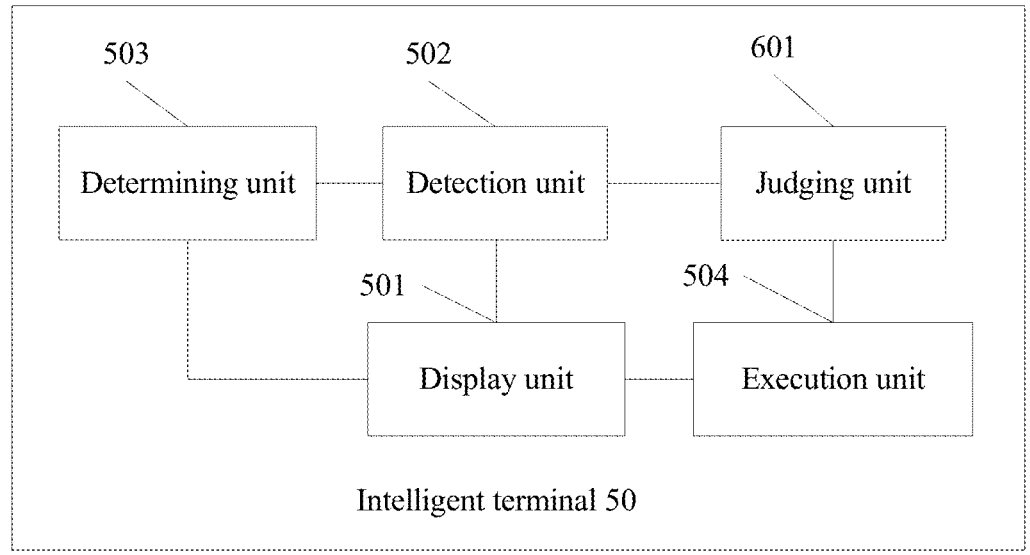
FIG. 6 is a structural diagram of an intelligent terminal according to another embodiment of the present invention.

Optionally, as shown in FIG. 6, the intelligent terminal 50 further includes a judging unit 601.

The judging unit 601 is configured to determine, when the detection unit detects that the user finishes the user input, whether the display unit fully displays the remove animation.

The execution unit 504 is further configured to, when the remove animation is not fully displayed, stop displaying the remove animation, and reversely demonstrate, from a stop point, the displayed remove animation from back to front.

That is, when the intelligent terminal demonstrates the remove animation, the user only needs to release screen touch input to abandon the remove operation. Because the remove animation stops without being fully demonstrated, the remove trigger is not activated, and the remove operation is not executed on the object selected by the user.

Optionally, the display unit 501 is specifically configured to display the remove confirmation button when the pressure value is greater than or equal to the preset threshold.

The execution unit 504 is further configured to execute, when the remove confirmation button is selected, the remove operation on the object selected by the user.

It may be learned from the foregoing that, by using the intelligent terminal control method provided in the present invention, a user input performed in an object management window is detected, where the user input includes a screen touch position of the user and a pressure value; an object selected by the user is determined according to the screen touch position; when the pressure value is greater than or equal to a preset threshold, a remove trigger is displayed; and when the remove trigger is activated, a remove operation is performed on the object selected by the user. By detecting the object selected by the user and the pressure value of the user input, the user is prompted, in a form of the remove trigger, about whether to execute the remove operation. This facilitates a user operation on the object selected by the user and improves user experience.

Figure 7:
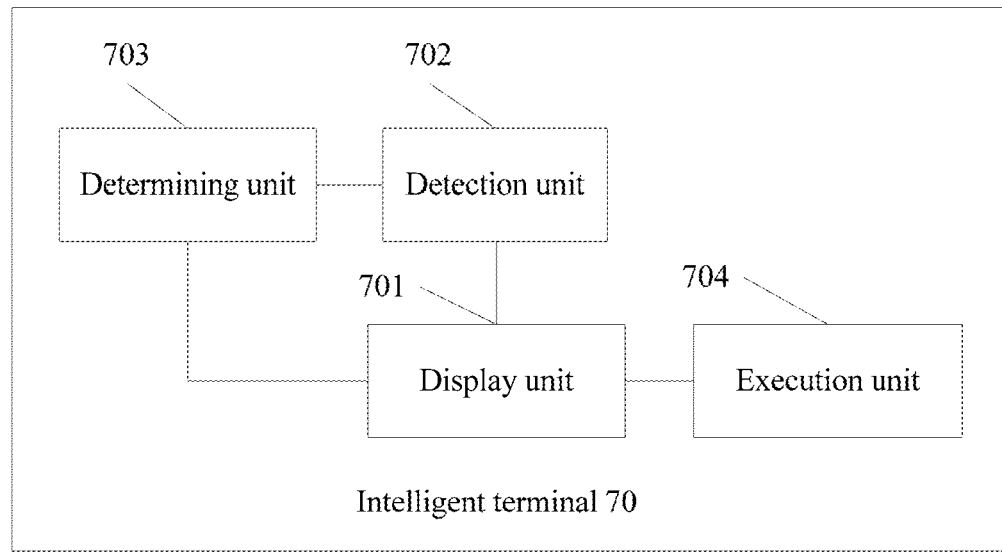
FIG. 7 is a structural diagram of an intelligent terminal according to another embodiment of the present invention.

In another embodiment of the present invention, as shown in FIG. 7, FIG. 7 is an intelligent terminal 70, and the intelligent terminal 70 includes a display unit 701, a detection unit 702, a determining unit 703, and an execution unit 704.

The display unit 701 is configured to display an emoticon selection window.

When a chat is performed by using a communication tool or a comment is made by using a web page, a suitable emoticon is generally selected in the emoticon selection window to express an emotional tendency.

The detection unit 702 is configured to detect a user input performed in the emoticon selection window, where the user input includes a screen touch position of the user and a pressure value.

When the user performs an operation in the object management window, the detection unit 702 needs to detect the screen touch position of the user and obtain the pressure value of a screen touch.

The determining unit 703 is configured to determine, according to the screen touch position, an emoticon type selected by the user.

The display unit 701 is further configured to determine, according to the pressure value, an emoticon or an emoticon animation, corresponding to the pressure value, of the emoticon type selected by the user.

A different pressure value causes a change to a form of the object selected by the user. For example, if the emoticon type selected by the user is a happiness type (for example, a smile icon), when the pressure value is greater than or equal to a first preset threshold and less than a second preset threshold, a face icon stays in a smile state; when the pressure value is greater than or equal to the second preset threshold and less than a third preset threshold, the face icon stays in a guffaw state.

The execution unit 704 is configured to determine and apply, when the detection unit 702 detects that the user finishes the user input, the emoticon or emoticon animation currently displayed by the display unit 701.

It may be learned from the foregoing that, by using the intelligent terminal control method provided in the present invention, a user input performed in an emoticon selection window is detected, where the user input includes a screen touch position of the user and a pressure value; an emoticon type of the user is determined according to the screen touch position; an emoticon or an emoticon animation, corresponding to the pressure value, of the emoticon type selected by the user is determined according to the pressure value; and when the detection unit detects that the user finishes the user input, the emoticon or emoticon animation currently displayed by the display unit is determined and applied. By detecting the pressure value, the emoticon or emoticon animation, corresponding to the pressure value, of the emoticon type is obtained and applied. This facilitates user selection and improves user experience.

Figure 8:
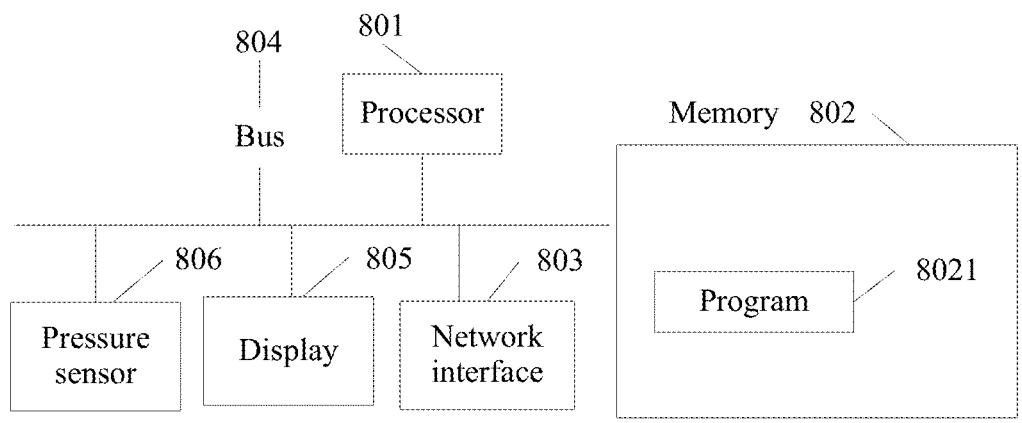
FIG. 8 is a structural diagram of an intelligent terminal according to another embodiment of the present invention.

FIG. 8 describes a structure of an intelligent terminal according to another embodiment of the present invention, where the structure of the intelligent terminal includes at least one processor 801 (for example, a CPU), memory 802, at least one network window 803, at least one communications bus 804, a display 805, and a pressure sensor 806. The processor 801 is configured to execute an executable module, such as a computer program, stored in the memory 802. The pressure sensor 806 is configured to obtain a pressure value. The memory 802 may include a high-speed random access memory (RAM: Random Access Memory) and may further include a non-volatile memory (non-volatile memory), for example, at least an eMMC (Embedded Multi Media Card, embedded multimedia card) memory. By using at least one network window 803 (which may be wired or wireless), a communication connection between a network device and at least one other network element is implemented over the Internet, a wide area network, a local area network, a metropolitan area network, and the like.

In some implementation manners, the memory 802 stores a program 8021, and the program 8021 may be executed by the processor 801. This program includes:

displaying an object management window;

detecting a user input performed in the object management window, where the user input includes a screen touch position of the user and a pressure value;

determining, according to the screen touch position, an object selected by the user; and compressing, when the pressure value is greater than or equal to a preset threshold, the object selected by the user.

Optionally, the compressing the object selected by the user includes:

compressing, according to a preset compression rate in the object management window, the object selected by the user into a package.

Optionally, before the compressing the object selected by the user, the program further includes:

obtaining a compression rate according to the pressure value; and the compressing the object selected by the user includes:

compressing, according to the obtained compression rate in the object management window, the object selected by the user into the package.

Optionally, the compressing the object selected by the user includes:

performing, in the object management window, storage capacity compression on the object selected by the user.

It may be learned from the foregoing that, by using the intelligent terminal control method of this embodiment of the present invention, a user input performed in an object management window is detected, where the user input includes a screen touch position of the user and a pressure value; an object selected by the user is determined according to the screen touch position; and when the pressure value is greater than or equal to a preset threshold, compression is performed on the object selected by the user. This facilitates a user operation on an operable object and improves user experience.

Figure 9:
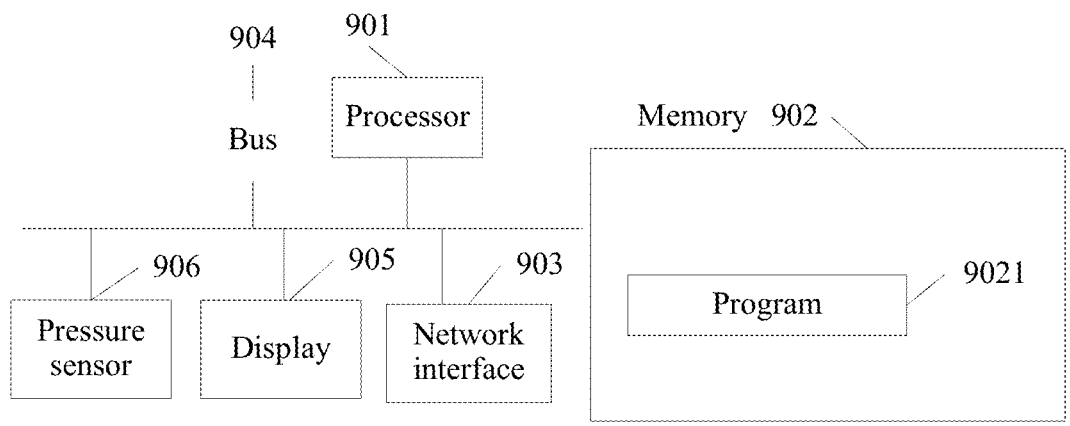
FIG. 9 is a structural diagram of an intelligent terminal according to another embodiment of the present invention.

FIG. 9 describes a structure of an intelligent terminal according to another embodiment of the present invention, where the structure of the intelligent terminal includes at least one processor 901 (for example, a CPU), memory 902, at least one network window 903, at least one communications bus 904, a display 905, and a pressure sensor 906. The pressure sensor 906 is configured to obtain a pressure value. The processor 901 is configured to execute an executable module, such as a computer program, stored in the memory 902. The memory 902 may include a high-speed random access memory (RAM: Random Access Memory) and may further include a non-volatile memory (non-volatile memory), for example, at least an eMMC (Embedded Multi Media Card, embedded multimedia card) memory. By using at least one network window 903 (which may be wired or wireless), a communication connection between a network device and at least one other network element is implemented over the Internet, a wide area network, a local area network, a metropolitan area network, and the like.

In some implementation manners, the memory 902 stores a program 9021, and the program 9021 may be executed by the processor 901. This program includes:

displaying an object management window;

detecting a user input performed in the object management window, where the user input includes a screen touch position of the user and a pressure value;

determining, according to the screen touch position, an object selected by the user;

displaying a remove trigger when the pressure value is greater than or equal to a preset threshold; and executing, when the remove trigger is activated, a remove operation on the object selected by the user.

Optionally, the displaying a remove trigger when the pressure value is greater than or equal to a preset threshold includes:

displaying a remove animation when the pressure value is greater than or equal to the preset threshold; and the executing, when the remove trigger is activated, a remove operation on the object selected by the user includes:

executing, when the remove animation is fully displayed, the remove operation on the object selected by the user.

Optionally, when it is detected that the user finishes the user input, it is determined whether to fully display the remove animation; and when the remove animation is not fully displayed, the display of the remove animation is stopped, and the displayed remove animation is reversely demonstrated from a stop point from back to front.

Optionally, the displaying a remove trigger when the pressure value is greater than or equal to a preset threshold includes:

displaying a remove confirmation button when the pressure value is greater than or equal to the preset threshold; and the executing, when the remove trigger is activated, a remove operation on the object selected by the user includes:

executing, when the remove confirmation button is selected, the remove operation on the object selected by the user.

It may be learned from the foregoing that, by using the intelligent terminal control method provided in the present invention, a user input performed in an object management window is detected, where the user input includes a screen touch position of the user and a pressure value; an object selected by the user is determined according to the screen touch position; when the pressure value is greater than or equal to a preset threshold, a remove trigger is displayed; and when the remove trigger is activated, a remove operation is performed on the object selected by the user. By detecting the object selected by the user and the pressure value of the user input, the user is prompted, in a form of displaying the remove trigger, about whether to execute the remove operation. This facilitates a user operation on the object selected by the user and improves user experience.

Figure 10:
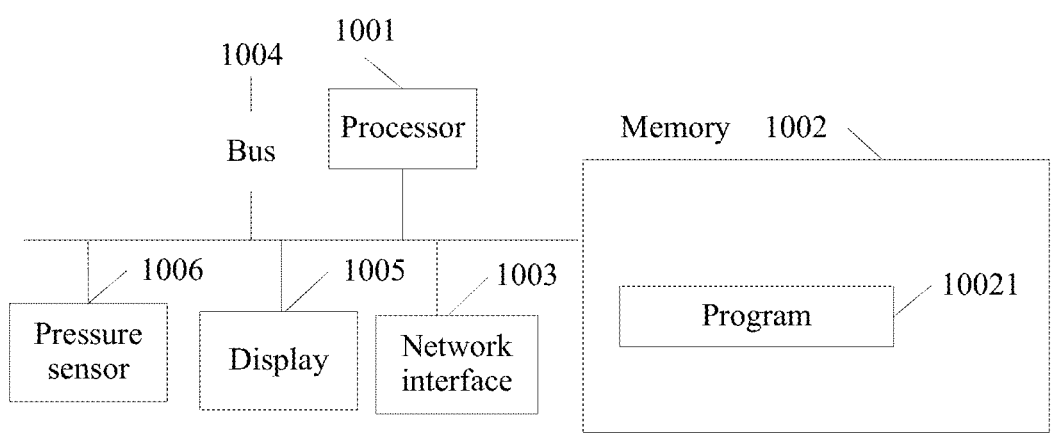
FIG. 10 is a structural diagram of an intelligent terminal according to another embodiment of the present invention.

FIG. 10 describes a structure of an intelligent terminal according to another embodiment of the present invention, where the structure of the intelligent terminal includes at least one processor 1001 (for example, a CPU), memory 1002, at least one network window 1003, at least one communications bus 1004, a display 1005, and a pressure sensor 1006. The pressure sensor 1006 is configured to obtain a pressure value. The processor 1001 is configured to execute an executable module, such as a computer program, stored in the memory 1002. The memory 1002 may include a high-speed random access memory (RAM: Random Access Memory) and may further include a non-volatile memory (non-volatile memory), for example, at least an eMMC (Embedded Multi Media Card, embedded multimedia card) memory. By using at least one network window 1003 (which may be wired or wireless), a communication connection between a network device and at least one other network element is implemented over the Internet, a wide area network, a local area network, a metropolitan area network, and the like.

In some implementation manners, the memory 1002 stores a program 10021, and the program 10021 may be executed by the processor 1001. This program includes:

displaying an emoticon selection window;

detecting a user input performed in the emoticon selection window, where the user input includes a screen touch position of the user and a pressure value;

determining, according to the screen touch position, an emoticon type selected by the user;

displaying, according to a dynamic change of the pressure value, an emoticon or an emoticon animation, corresponding to the pressure value, of the emoticon type selected by the user; and determining and applying, when it is detected that the user finishes the user input, the currently displayed emoticon or emoticon animation.

It may be learned from the foregoing that, by using the intelligent terminal control method provided in the present invention, a user input performed in an emoticon selection window is detected, where the user input includes a screen touch position of the user and a pressure value; an emoticon type selected by the user is determined according to the screen touch position; an emoticon or an emoticon animation, corresponding to the pressure value, of the emoticon type selected by the user is determined according to the pressure value; and when it is detected that the user finishes the user input, the currently displayed emoticon or emoticon animation is determined and applied. By detecting the pressure value, an emoticon or an emoticon animation, corresponding to the pressure value, of the emoticon selected by the user is selected and applied. This facilitates user selection and improves user experience.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are exemplary embodiments, and the related actions and modules are not necessarily mandatory to the present invention.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. An intelligent terminal control method, wherein the method comprises:
    displaying an object management window;
    detecting a user input performed in the object management window, wherein the user input comprises a screen touch position of the user and a pressure value;
    determining, according to the screen touch position, an object selected by the user;
    displaying a remove animation when the pressure value is greater than or equal to the preset threshold; and
    executing, after the remove animation is fully displayed, a remove operation on the object selected by the user.

2. The method according to claim 1, wherein the method further comprises:
    determining, when it is detected that the user finishes the user input, whether to fully display the remove animation; and
    when the remove animation is not fully displayed, stopping displaying the remove animation, and reversely demonstrating, from a stop point, the displayed remove animation from back to front.

3. The method according to claim 1, further comprising:
    displaying a remove trigger when the pressure value is greater than or equal to a preset threshold;
    displaying a remove confirmation button when the pressure value is greater than or equal to the preset threshold; and
    executing, when the remove trigger is activated, a remove operation on the object selected by the user comprises:
    executing, when the remove confirmation button is selected, the remove operation on the object selected by the user.

4. An intelligent terminal control method, comprising:
    displaying an emoticon selection window;
    detecting a user input performed in the emoticon selection window, wherein the user input comprises a screen touch position of the user and a pressure value;
    determining, according to the screen touch position, an emoticon type selected by the user;
    displaying, according to a dynamic change of the pressure value, an emoticon or an emoticon animation of the emoticon type selected by the user;
    detecting whether the user has finished providing the user input in the emoticon selection window; and
    determining and applying, when it is detected that the user has finished providing the user input, the currently displayed emoticon or emoticon animation.

5. An intelligent terminal comprising one or more processors configured to execute program components, wherein the components comprise:
    a display unit, configured to display an object management window;
    a detection unit, configured to detect a user input performed in the object management window, wherein the user input comprises a screen touch position of the user and a pressure value;
    a determining unit, configured to determine, according to the screen touch position, an object selected by the user, wherein
    the display unit is further configured to display a remove animation when the pressure value is greater than or equal to the preset threshold; and
    an execution unit, configured to execute, after the remove animation is fully displayed, a remove operation on the object selected by the user.

6. The intelligent terminal according to claim 5, wherein the intelligent terminal further comprises a judging unit, wherein
    the judging unit is configured to determine, when the detection unit detects that the user finishes the user input, whether the display unit fully displays the remove animation; and
    the execution unit is further configured to, when the remove animation is not fully displayed, stop displaying the remove animation, and reversely demonstrate, from a stop point, the displayed remove animation from back to front.

7. The intelligent terminal according to claim 5, wherein:
    the display unit is configured to:
    display a remove trigger when the pressure value is greater than or equal to a preset threshold; and
    display a remove confirmation button when the pressure value is greater than or equal to the preset threshold; and
    the execution unit is further configured to execute, when the remove confirmation button is selected, the remove operation on the object selected by the user.

8. An intelligent terminal comprising one or more processors configured to execute program components, wherein the components comprise:
    a display unit, configured to display an emoticon selection window;
    a detection unit, configured to detect a user input performed in the emoticon selection window, wherein the user input comprises a screen touch position of the user and a pressure value;
    a determining unit, configured to determine, according to the screen touch position, an emoticon type selected by the user, wherein
    the display unit is further configured to:
        display, according to a dynamic change of the pressure value, an emoticon or an emoticon animation of the emoticon type selected by the user; and
        detect whether the user has finished providing the user input in the emoticon selection window; and
    an execution unit, configured to determine and apply, when the detection unit detects that the user has finished providing the user input, the emoticon or emoticon animation currently displayed by the display unit.

* * * * *